United States Patent [19]

Watton

[11] 4,095,451
[45] Jun. 20, 1978

[54] GAS TURBINE BLADES

[75] Inventor: William Thomas Watton, Sheffield, England

[73] Assignee: Bramah Limited, Sheffield, England

[21] Appl. No.: 790,812

[22] Filed: Apr. 25, 1977

[30] Foreign Application Priority Data

Apr. 26, 1977 United Kingdom ............... 16842/77

[51] Int. Cl.² ............................................. B21K 3/04
[52] U.S. Cl. ................................. 72/340; 29/156.8 B
[58] Field of Search .................... 29/156.8 B, 156.8 H, 29/401 R; 72/189, 340

[56] References Cited

U.S. PATENT DOCUMENTS

| 2,925,649 | 2/1960 | Boon | 29/156.8 B |
| 4,028,787 | 6/1977 | Cretella et al. | 29/156.8 B |

Primary Examiner—Lowell A. Larson
Attorney, Agent, or Firm—Lowe, King, Price & Markva

[57] ABSTRACT

In a method and equipment for refurbishing gas turbine blades a portion of each blade extending from the tip is rolled under pressure, the direction of rolling being towards the tip, to effect extension of the tip, after which the extended tip is machined to a predetermined overall length of the blade, the rolling being effected between a pair of rollers, one with a convex profile and the other with a concave profile corresponding to the inside and outside respectively of the aerofoil section of the blade, one roller being fixed and the other roller being movable by pressure applying means towards the fixed roller, a carrier for the blade being rotatable and slidable in a guide aligned with the position of closest approach of the rollers, and driving means being provided for rotating the fixed roller such that its periphery moves through the position of closest approach in a direction towards the guide for the carrier.

6 Claims, 6 Drawing Figures

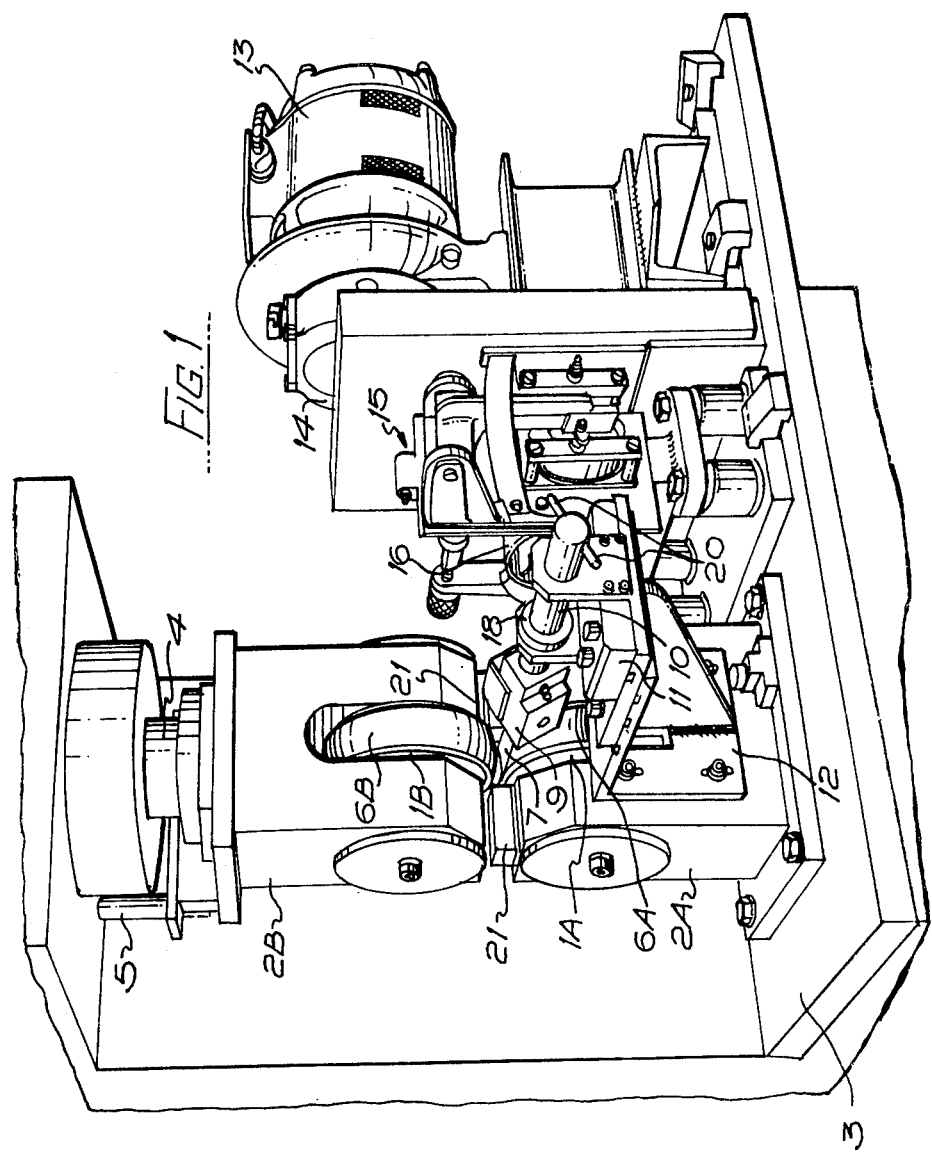

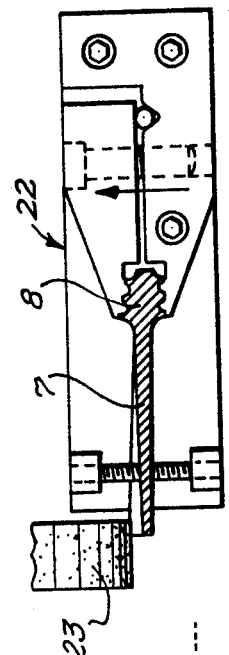
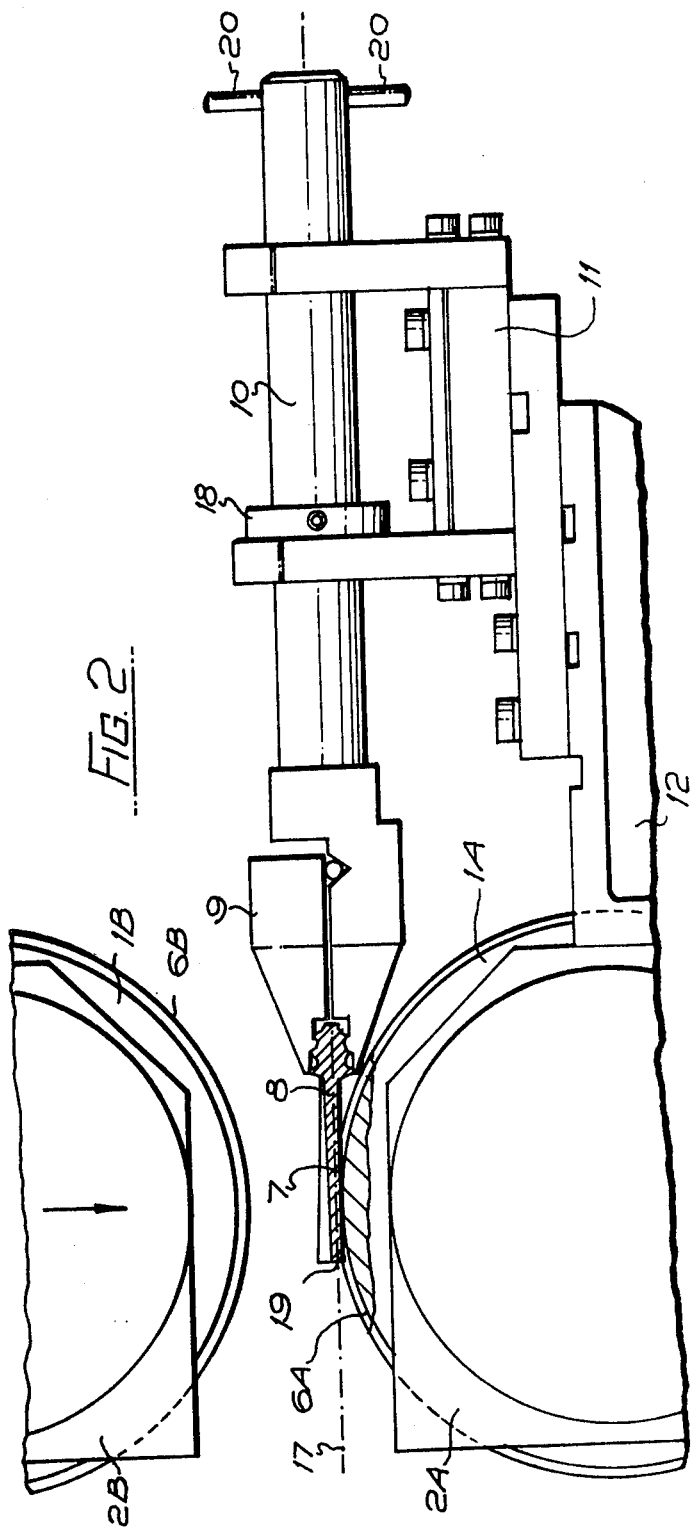

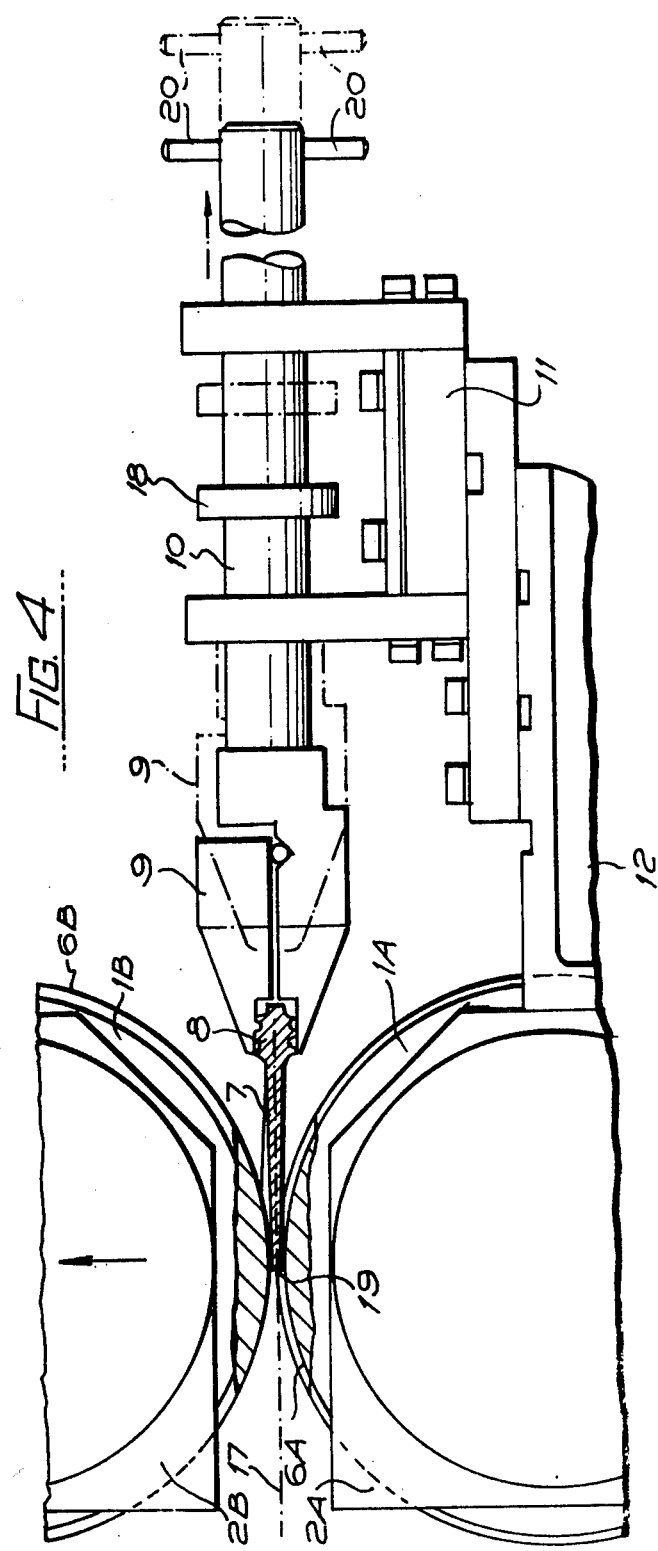

GAS TURBINE BLADES

This invention relates to the refurbishing of gas turbine blades, including compressor blades, especially when the tips are worn, to extend the effective working life, and equipment for effecting it.

According to the present invention, a method of refurbishing a gas turbine blade comprises rolling under pressure a portion of the blade extending from the tip, the direction of rolling being towards the tip, to effect extension of the tip, and machining the extended tip to a predetermined overall length of the blade.

Only a few thousands or tens of thousandths of an inch (say anything up to 60 thousandths) of extension may be necessary to increase appreciably the life of a blade, without materially impairing its strength. Indeed, the working of the metal in the rolling stage may well counteract the effect of reducing the section.

The rolling pressure may be increased as rolling progresses towards the tip, or maintained constant, or decreased as rolling progresses towards the tip. The reduction in sectional thickness from its actual thickness being a function of the pressure applied, and the extension being proportional to the reduction, a required amount of extension can be obtained by a predetermined amount of rolling pressure.

For a blade of a material which has low ductility and is difficult to form cold (i.e., at room temperature) the blade is preferably heated, before or during rolling.

According to another aspect of the present invention, equipment for use in refurbishing gas turbine blades comprises a pair of rollers, one having a convex profile corresponding to the inside of the aerofoil section of a gas turbine blade and the other having a concave profile corresponding to the outside of a turbine blade, the rollers being mounted on parallel axes one of which is fixed and the other of which is movable towards and away from the other, means for applying pressure to the movable roller in the direction of movement towards the fixed roller, a carrier for a blade with gripping means for holding the root of the blade, a guide for the carrier within which guide the carrier is rotatable about the stacking axis of the blade and is axially slidable towards and away from the position of closest approach of the rollers, and means for driving the fixed roller with a direction of rotation such that its periphery moves through the position of closest approach to the movable roller in a direction towards the guide for the carrier.

With the movable roller spaced from the fixed roller and with the fixed roller stationary, a blade held by its root in the gripping means of the carrier is presented to the fixed roller at a position intermediate the tip and the root by pushing the carrier towards the fixed roller, the movable roller is brought into contact with the blade and pressure applied, and the fixed roller is driven, to roll the blade towards the tip as the blade is driven out from between the rollers, the carrier rotating as necessary to follow the rotation of the aerofoil section.

The carrier is preferably provided with an axially adjustable stop, for predetermining the position at which the blade is presented to the fixed roller. The carrier is also preferably provided with a handle remote from the gripping means to assist in moving the carrier towards the fixed roller and rotating the carrier for setting the blade correctly against the profile of the fixed roller (and, consequently, correctly for the profile of the movable roller).

Conveniently, the axes of the rollers are horizontal, with the fixed roller in a bearing mounted on a press table and the movable roller in a bearing carried by a press ram, with the guide for the carrier secured to the bearing for the fixed roller and with the driving means for the fixed roller mounted on the press table.

The driving means for the fixed roller may be an electric motor driving through a reduction gear, and preferably through a brake, which in addition to stopping the fixed roller after each rolling operation may also serve to prevent premature ejection of a blade from between the rollers by virtue of the wedge effect of the tapering blade and the pressure between the rolls creating a substantial horizontal component of force on the blade.

Adjustable stop means may be provided between the bearings of the rollers to limit the closing of the rollers to a predetermined amount, to limit the reduction in sectional thickness of the blade to a predetermined maximum.

Either or both rollers may be heated, by electrical heaters incorporated in the rollers, to assist rolling of blades formed of metals having low ductility and which are difficult to form cold.

The method of the invention and equipment for carrying out the method will now be described, by way of example only, with reference to the accompanying drawings, in which:

FIG. 1 is a perspective view of the equipment;

FIGS. 2 to 4 are diagrammatic elevations of the rollers and blade carrier, showing the rolling of a blade.

FIG. 6 is a front view of a grinder performing the machining step of the method.

Figure 3:
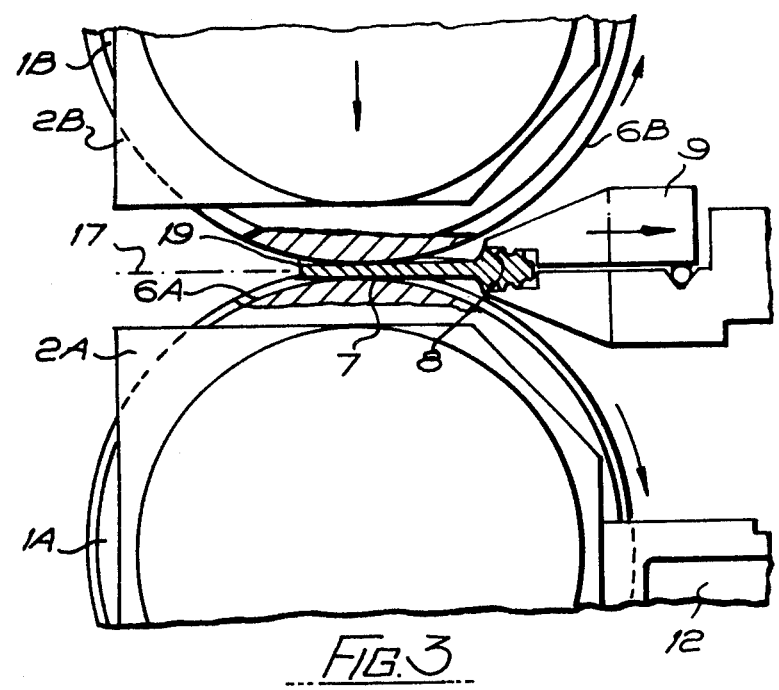

In the drawings, equipment for use in refurbishing gas turbine blades, including compressor blades, especially when the tips are worn, to extend the effective working life, comprises a roller 1A mounted in a fixed bearing 2A on a press table 3 and a roller 1B in a bearing 2B carried by the press ram 4, with a guide 5 whereby the axis of the roller 1B is kept parallel to the axis of the roller 1A as the roller 1B is moved by the ram towards and away from the roller 1B. The roller 1A has a concave profile 6A corresponding to the outside of the aerofoil section of a gas turbine balde 7, the root 8 of which is held by gripping means 9 of a carrier 10 in a guide 11 on a bracket 12 secured to the fixed bearing 2A, and the roller 1B has a convex profile 6B corresponding to the inside of the blade.

The roller 1A is adapted to be driven in the direction indicated in FIG. 3 by means of an electric motor 13, mounted on the press table, and driving through a reduction gear 14 and a brake 15 (the drum 16 of which can be seen in FIG. 1).

Figure 5:
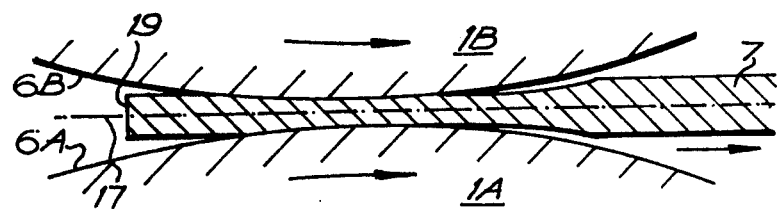
FIG. 5 is an enlargement of part of FIG. 3 showing the rolling action.

The carrier 10 is rotatable in the guide 11 about the stacking axis 17 of the blade 7. The carrier is also slidable in the guide and is provided with an adjustable stop 18 for predetermining the position (intermediate its root 8 and its tip 19) at which the blade is presented to the roller 1A (and, consequently, correctly for the profile 6B of the roller 1B), With the movable roller 1B spaced from the fixed roller 1A and with the roller 1A stationary as shown in FIG. 2, the blade 7 is presented to the roller 1A at a position intermediate the tip 19 and the root 8 by pushing the carrier 10 as far as allowed by the preset stop 18, the movable roller 1B is brought into contact with the blade and pressure applied, and the fixed roller is driven, as indicated in FIG. 3, to roll the blade towards the tip (see FIG. 5) as the blade is driven out from between the rollers, ending as shown in FIG. 4, the carrier 10 rotating as necessary to follow the rotation of the aerofoil section (the effect of which rotation has not been depicted in FIGS. 2 to 4).

In addition to stopping the fixed roller 1A after each rolling operation, the brake also serves to prevent premature ejection of the blade 7 from between the rollers 1A, 1B by virtue of the wedge effect of the tapering blade and the pressure between the rollers creating a substantial horizontal component of force on the blade.

Only a few thousandths of an inch rolled off the thickness of the blade may be needed to effect extension by a few thousandths or tens of thousandths of an inch, say anything up to 60 thousandths, and the tip of the extended blade can be ground back to a predetermined length, e.g., the orginal length, as shown in FIG. 6. To carry out this step of the method, the blade 7 may be clamped in a jig 22, which clamps at the root 8 as well as closer to the tip 19 to hold the blade steady during grinding by conventional grinding wheel 23.

Adjustable stops 21 (FIG. 1 only) are provided between the bearings 2A, 2B to limit the closing of the rollers 1A, 1B to a predetermined amount, to limit the reduction in sectional thickness of the blade 7 to a predetermined maximum.

Either or both rollers may be heated, by electrical heaters (e.g., cartridge heaters, not shown) incorporated in the roller or rollers, to assist rolling of blades formed of metals having low ductility and which are difficult to form cold, or such blades may be heated before being rolled as aforesaid.

In FIG. 4 the carrier 10 is indicated in broken line as having been drawn back (by means of the handle 20) as far as possible, to facilitate insertion and removal of blades at the gripping means 9 well clear of the rollers 1A, 1B.

I claim:

1. A method of refurbishing a gas turbine blade comprising rolling under pressure a portion of the blade extending from the tip, the direction or rolling being towards the tip, to effect extension of the tip, and machining the extended tip to a predetermined overall length of the blade.

2. A method as in claim 1, wherein the rolling pressure is increased as rolling progresses towards the tip.

3. A method as in claim 1, wherein the rolling pressure is maintained constant.

4. A method as in claim 1, wherein the rolling pressure is decreased as rolling progresses towards the tip.

5. A method as in claim 1, wherein the blade is heated.

6. A method as in claim 5, wherein the blade is heated during rolling.

* * * * *